United States Patent [19]

Grozinger

[11] 4,307,311

[45] Dec. 22, 1981

[54] WINDING METHOD FOR AN ELECTRICAL GENERATOR AND GENERATOR MANUFACTURED BY THE METHOD

[75] Inventor: Alfred Grozinger, Stuttgart, Fed. Rep. of Germany

[73] Assignee: Robert Bosch GmbH, Stuttgart, Fed. Rep. of Germany

[21] Appl. No.: 140,719

[22] Filed: Apr. 16, 1980

[30] Foreign Application Priority Data

May 25, 1979 [DE] Fed. Rep. of Germany ....... 2921114

[51] Int. Cl.³ .............................................. H02K 1/00
[52] U.S. Cl. ..................................... 310/179; 29/596; 242/1.1 R
[58] Field of Search ........ 310/179, 180, 184, 198–208; 29/596; 242/1.1 R

[56] References Cited

U.S. PATENT DOCUMENTS 744,145  11/1903  Wiard .................................. 310/180

Primary Examiner—J. V. Truhe
Assistant Examiner—Morris Ginsburg

Attorney, Agent, or Firm—Frishauf, Holtz, Goodman & Woodward

[57] ABSTRACT

A three-phase stator winding of an alternator is divided into six partial windings. Each partial winding, regardless of electrical phase, is wound starting at the slot immediately adjacent to the slot wherein the last previously wound winding was started and in the same winding direction. The first partial windings for the subsequent phases are also inserted in the slots in the same direction as the first partial winding for the first phase, so that connecting arcs are formed on the same side of the stator as was the case for the first phase. The second partial windings for each phase are placed so that the connecting arcs form on the side of the stator opposite to that on which the first connecting arcs were formed. The winding starts and winding ends of each of the partial windings associated with a given phase are connected so that the partial windings are connected either in series or in parallel. The so-formed series or parallel circuits are then connected to form either a Y or a Δ configuration.

9 Claims, 9 Drawing Figures

"Y" series
"Y" parallel

Delta Series

Delta Parallel

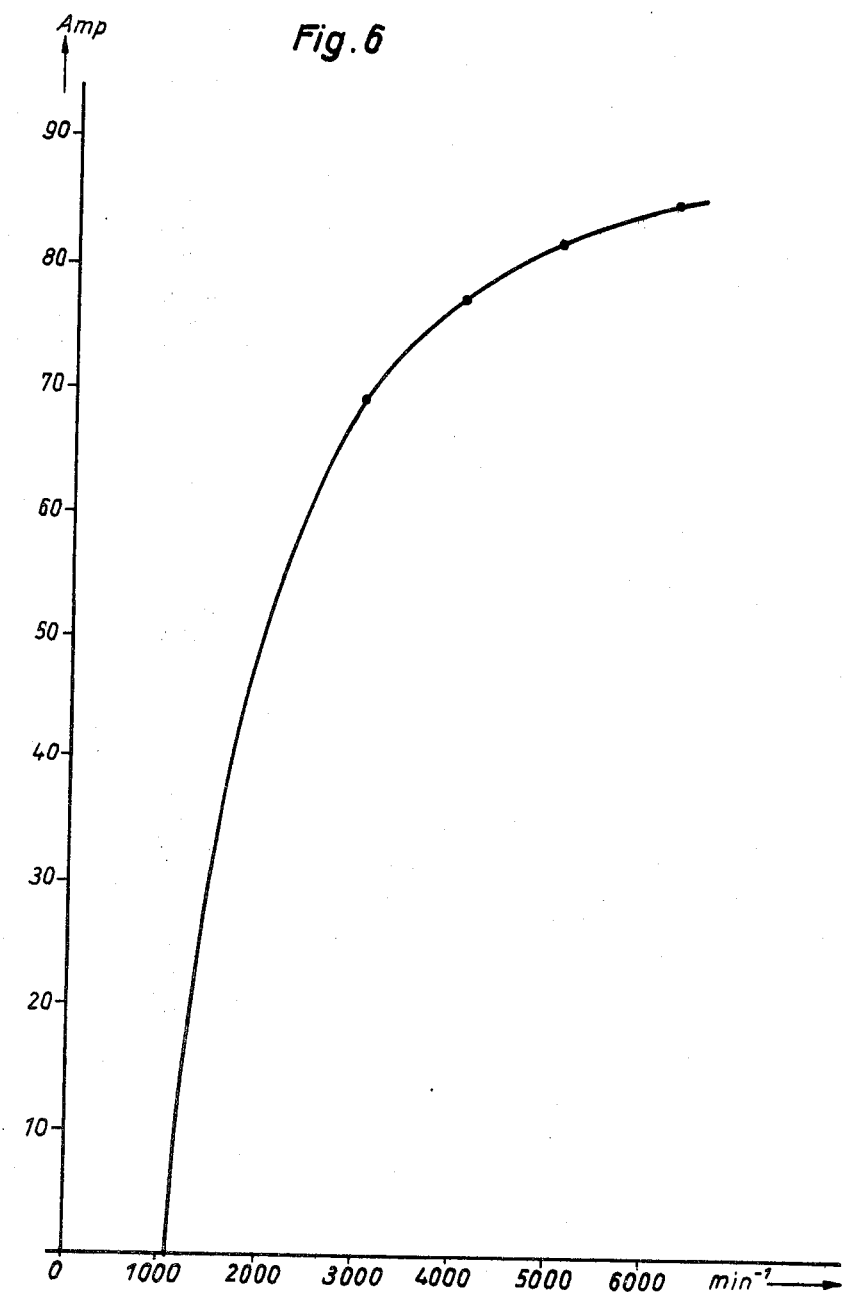

WINDING METHOD FOR AN ELECTRICAL GENERATOR AND GENERATOR MANUFACTURED BY THE METHOD

The present invention relates to a winding method for electrical generators and to electrical generators produced by this winding method. In particular, alternators for use in motor vehicles are concerned.

BACKGROUND AND PRIOR ART

For alternators used in motor vehicles, such as trucks, railroads, etc. particular physical dimensions are associated with specific power outputs. A required power output must be met in consideration of the available space in the vehicle.

In alternators of a known type, the stator has slots which accommodate the three phases of a winding. The winding is so inserted into the slots that, electrically speaking, three different phases, each at an angle of 120° to the others, result as a consequence of the magnetic induction of the rotating field generated by the rotor.

The rotating armature or rotor generally has an exciter winding to which a controlled current is applied and which rotates with the rotating armature. Alternatively, it is also stationary. In the latter case, an alternating magnetic field results from a particular shape of the armature (claw-pole rotor) which induces the voltages of correct phase in the stator windings. The stator windings can be connected in a Δ connection or in a Y connection. If the exciter winding rotates with the armature, then the exciter current (DC current) is applied to it by two slip rings.

Since in motor vehicles a battery is generally used for energy storage, the circuits which constitute the load are DC circuits so that the AC current furnished by the alternator is rectified by means of bridge circuits before being applied to the load.

For winding the stator with the coils for generating the different phase voltages, two winding methods are known, namely wave winding and lap winding. The following discussion concerns itself mostly with the wave winding process. If three-phase generators are concerned, as is the case in motor vehicles, then the stator is wound with three coils, the rotation of the armature inducing a voltage in each of the coils which, as previously mentioned, is at a phase angle of 120 electrical degrees relative to the others.

The known wave winding method will now be explained with reference to FIGS. 1 and 3. The three coils to be wound in the wave winding are to be accommodated in the slots of the stator in such a way that the desired phase distribution results with a particularly high utilization factor for the space inside the slots. The method is illustrated schematically in FIG. 3. It is assumed that the stator unit is ring shaped and that the winding is to be inserted automatically into slots on the inner surface. The conventional stator has 36 slots, the number of slots presenting the best solution for the unit in view of the requirements for overall dimension, stability, and capacity for carrying the coils having particular wire thicknesses for carrying the required currents. In FIG. 3, slots 1–14 are pictured. Of course these will be continued by slots 15–35 (not shown); slot 36 then adjoins slot 1.

For a three-phase system, three coils I, II, and III are to be wound into the slots. The winding can begin with any selected coil, for example coil I, whose winding is inserted into slot 1, continues by an upper arc Ia into slot 4 and then through a lower arc Ib into slot 7, etc. It will be noted that a wave winding results, the straight portions of the coil being inserted into slots of the stator skipping two slots, until the required number of windings for the coil generating the voltage of the first phase has been manufactured. It will also be noted that winding of the stator with the first coil starting at slot 1 does not result in any difficulties. The windings or bars of the coil can be pushed down onto the bottom of the slot and nothing stands in the way of their insertion.

When coil II is to be considered, this situation is already different. First, only the mechanical winding procedure will be considered, the electrical connections being explained later on. The first bar or straight portion of coil II is to be inserted into slot 3. However, this part of coil II can already not be inserted properly to the bottom of the slot since at position x in the upper region of FIG. 3 a crossover occurs with the upper arc of coil I (shown in a solid line). This crossover cannot be avoided. This means that in this location the coil of phase winding II is pushed somewhat in the direction of the stator interior, that is does not sit properly in slot 3. Correspondingly, the upper arc IIa of winding II is somewhat slanted until insertion into slot 6. At slot 6, at least in the upper region thereof, this winding can be inserted without difficulty into the slot. However in the lower region, at y, a crossover again occurs with the already inserted and fully wound coil I. It will be noted that even the second coil II cannot be inserted without hindrance into the stator slots assigned thereto. This already decreases the utilization factor for the slots of winding II. However, the difficulty becomes extreme when coil III, illustrated in FIG. 3 in a dot dash line, is to be inserted. Even the schematic representation shown in FIG. 3 makes it clear that crossover points occur both at the top and at the bottom, that is at y' as well as at x' with the previously inserted arcs $I_a$, $I_b$, $II_a$ . . . of coils I and II. The crossovers take place very closely to the slot into which the third coil is to be inserted, starting with slot 5 and then following with slot 8, slot 11, etc. In other words, the previously inserted coils I and II prevent the straight portions or bars of coil III from being pushed to the bottom of their assigned slots. The slots for stators for which this winding method is utilized must therefore be relatively deep so that all windings of the three coils can be accommodated. Of course free space remains within the slots, since the previously wound windings are always in the way of windings to be inserted at a later time.

The situation is illustrated in perspective in FIG. 1. It will be noted that coil I is accommodated with ease in its associated slots, two slots always being skipped for a three-phase system. This is no longer the case even for coil II. At location x a crossover point of the upper arc IIa with the upper arc Ia occurs. At point 1, which is further away from crossover point x, the winding can still be inserted into the associated slot and pushed to the bottom thereof without interference.

However, it will be noted from the perspective view in FIG. 1, the third coil III cannot be inserted properly in any location, since both previously wound coils are in the way. Both upper and lower crossover points with winding II occur at x' and crossover points z (both on top) with winding I. The last winding III is thus wound only from the outside, that is from the interior of the stator, onto windings I and II, so that the space within the slots which is available for winding III is not fully utilized and cannot be fully utilized since the upper and lower arcs of the previously inserted coils prevent such utilization. The result of this known winding method is therefore not satisfactory insofar as obtaining an optimum utilization factor for the slot space is concerned. It must, of course, also be kept in mind that any winding method which results in full utilization of the space in the slots must also be suitable for automatic winding.

THE INVENTION

It is an object of the present invention to furnish an alternator wherein the space within the slots of the stator is considerably more utilized than is the case with known alternators. The winding is to take place automatically. Further, the new winding method is to be carried out on automatic winding apparatus presently in use, only the control of the apparatus being subject to modification.

An alternator meeting the objectives described above will have an increased current output at a lesser noise level or decreased heating for the same current output as do present alternators having the same dimensions and the same number of slots in the stator.

The alternators of the present invention have a space utilization factor of the slots which is between 25 to 30 percent higher than the corresponding factor attainable with automatic winding apparatus presently known. The increased power output which is achieved by the alternators of the present invention result in an unusually steep characteristic curve, which is a further advantage.

Finally, the present invention is suitable for a great variety of different circuit connections, so that for a given required current very high voltages can be created or, if the voltage is to remain at the standard level such as 12 or 24 volts, much higher currents can be furnished.

The increased space utilization factor for the stator winding has the additional advantage that, instead of, for example, 8 conductors per slot for alternators furnishing up to 65 amperes, the alternator can be constructed with 7 conductors per slot thereby creating the above-mentioned steep characteristic curve. For example, at a rotational speed of 2,000 rpms a current of 50 amperes can be generated, while a current of 75 amperes can be generated at the maximum rotational speed.

In accordance with the present invention, for an alternator havin n phases, the winding for each phase is divided into two partial windings, each of the partial windings being wound in its entirety in the stator slots, starting at a first slot and skipping n+1 slots the partial windings being wound each starting in the slot immediately adjacent to the start of the previous winding. The winding takes place in such a way that with a mutual overlapping of the individual windings each stator slot is optimally utilized, starting at the bottom of the slot.

BRIEF DESCRIPTION OF THE DRAWING

FIG. 6 shows the characteristic curve of an alternator having a stator wound according to the present invention.

The basic idea of the present invention is that each phase winding of the stator is divided into two partial windings. As an example, a three-phase system will be discussed. The three-phase windings are therefore divided into six partial windings. The partial windings, each having a winding beginning and a winding end, are wound in a sequence such that the start of each partial winding is in the slot immediately adjoining the start of the previously wound partial winding. At the start, it is of no interest to which particular phase a particular partial winding belongs. The so-wound individual partial windings overlap each other mutually without interfering with one another. Further, segments are created around the periphery of the stator which again overlap each other. When each winding is thusly divided into two partial windings, each slot will contain winding elements which are associated with different partial windings, i.e. in each slot there will be a lower and an upper winding element. Of course, from the electrical point of view, the two partial windings whose bars are always inserted into the same slot must be associated with the same phase. This will be explained in greater detail below. The important thing is that the method according to the present invention allows a continuous automatic winding, the start of each partial winding always being inserted directly into the slot adjacent to the start of the previously partial winding, all of the partial windings being wound over the total circumference of the stator, always skipping two slots as is usual in three-phase systems.

Figure 1:
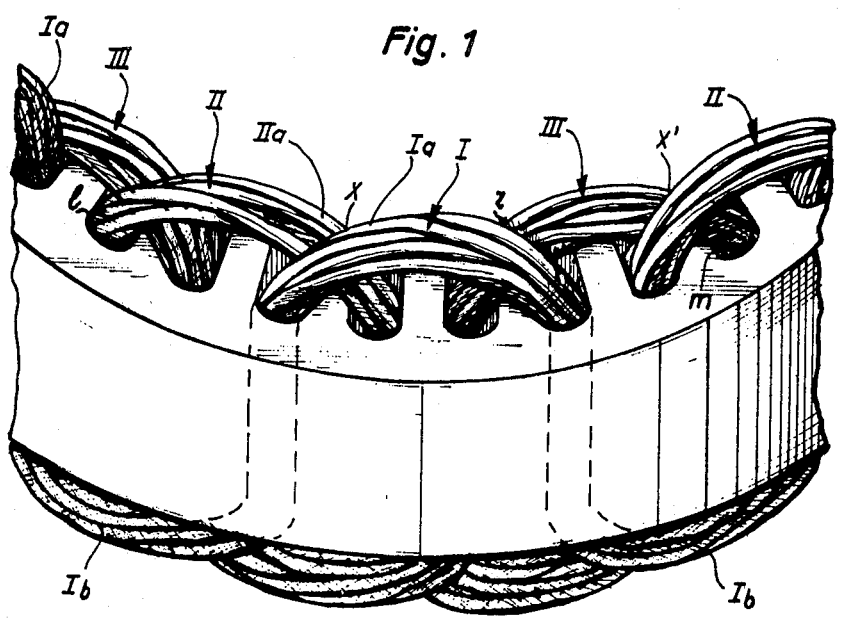
FIG. 1 is a perspective view of a stator wound in accordance with a prior art method.
Figure 2:
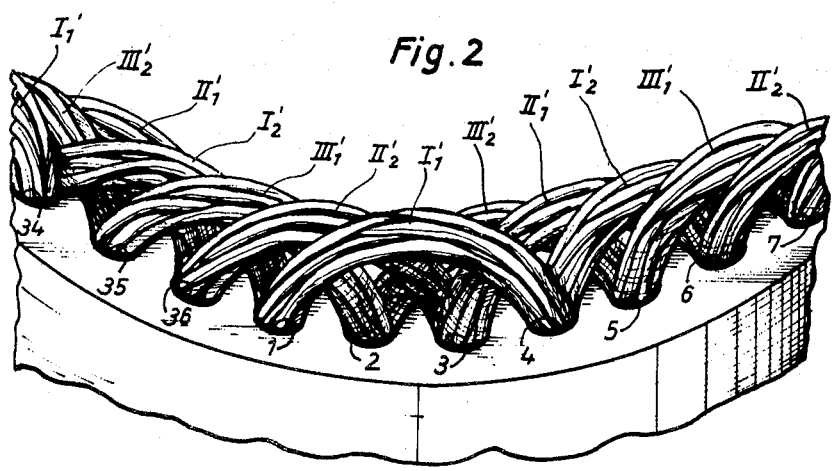
FIG. 2 is a perspective view of a stator wound according to the method of the present invention.
Figure 3:
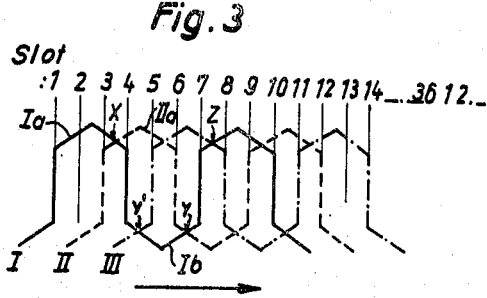
FIG. 3 is a schematic representation of the known winding method.
Figure 4:
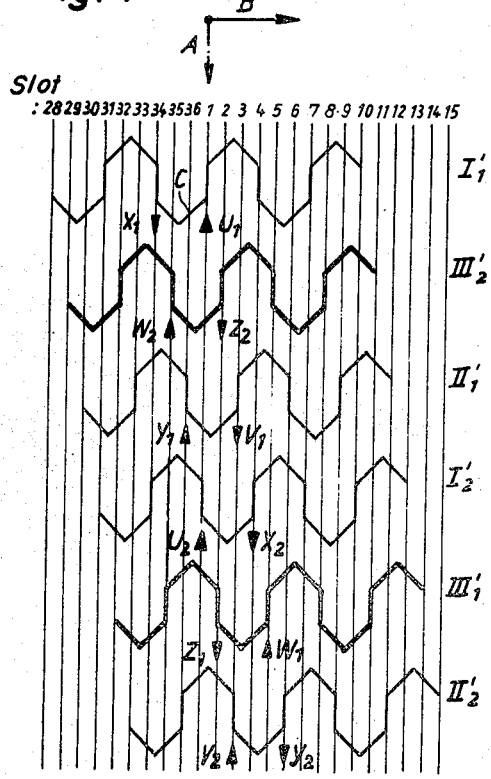
FIG. 4 is a schematic representation of a three-phase winding method according to the present invention.

In FIG. 2, the stator with the winding wound in accordance with the present invention is shown in a perspective view, while FIG. 4 illustrates it schematically similar to the illustration in FIG. 3, but showing each of the partial windings individually. Even a superficial comparison of FIGS. 1 and 2 will indicate immediately that, for the same dimensions, a greatly increased amount of copper can be accommodated in the stator of FIG. 2, that is the space utilization factor of the slots has been greatly increased.

It is, of course, true that for the new winding method utilizing six partial windings, 12 wire ends will have to be electrically connected with each other. This is no great disadvantage since these wire ends are all to be found in a narrow stator segment. For example, in the embodiment shown in FIG. 4, the wire ends can be found between slot 35 and slot 5. The electrical connection can therefore be carried out easily without requiring that wire ends be pulled around the periphery of the stator. In addition, a great many different interconnections can be carried out, thereby allowing stators meeting many different electrical requirements to be manufactured. This, too, will be discussed at greater length below. It should further be noted that while the method of the present invention is explained relative to a wave winding, the same concept can be applied to other winding methods, for example the known lap winding.

Since, for the illustrative example, two partial windings are created per phase winding, six partial windings will have to be inserted into the stator slots. These are designated by I1', I2', II1', II2', III1', and III2'.

FIG. 4 is first to be regarded from the mechanical point of view only. Slots 28–36 are shown which are immediately followed by slots 1–15. The representation is in a flattened out, i.e. developed form. It will be assumed that the mechanical winding process starts, as indicated by the dash line arrow A, in slot 1. Solid arrow B indicates the winding direction. The partial winding I1' is wound first and is inserted into the stator slots starting at slot 1. The start of this partial winding is designated by $U_1$. The windings of this coil will be inserted into slot 4, slot 7, slot 10, etc. i.e. two slots will always be skipped. This winding method causes arcs connecting the parts of the winding inserted into the slots to be formed at the top and the bottom of the stator, the arcs extending in the winding direction. The winding process is continued until the desired voltage output can be achieved, given the basic magnetic and electrical design data of the alternator. The end of the partial winding I1' is denoted by X1. A connection C is indicated between U1 and X1, this connection being meant solely to indicate the fact that this partial winding can be wound several times around the periphery of the stator.

The winding process then continues with winding of a partial winding III2' having a winding beginning Z2 and a winding end W2. It will be noted that the second partial winding, again without regard of any electromagnetic or electrical association of the partial winding, starts in slot 2, skips two slots, is inserted into slot 5, then into slot 8, etc. The winding process is then continued with partial windings III', I2', etc., the winding starts of the individual partial windings U1, Z2, V1, X2, W1, Y2 each being in a slot of the stator which, in the direction of winding, is immediately adjacent to the slot accommodating the start of the previously wound partial winding. The arrows at the beginning and ends of the windings are only indicative of the direction of current flow and should be disregarded during the discussion of the mechanical winding process.

As mentioned above, the partial windings are shown in FIG. 4, one under the other for purposes of clarity. Of course in the actual stator, these windings will be wound one upon the other. The windings of partial winding I1' are at the bottom of the stator slots, the partial winding III2' is wound next, winding III1' thereafter, etc. This winding process results in the overlapping shown in FIG. 2 and the vastly improved utilization of the space of the stator slots.

It should also be noted that when the partial winding designated I2' is inserted into slot 1, this takes place in the downward direction, i.e. opposite to the direction in which winding I1' was inserted. Similarly, partial winding III1' is inserted downwardly into slot 2, then upwardly into slot 5, etc. Thus, while the first three partial windings are wound, starting in adjacent slots and starting in the same direction in the slot, the second set of partial windings starting with winding I2' is inserted in the same slots, but in the opposite direction.

When the above-described winding process is carried out with a known wave winding apparatus, the 12 resulting free wire ends will comprise six short and six long ends. These must next be electrically interconnected.

To see how such interconnections should be carried out, reference is again made to FIG. 4. From FIG. 4, it can be clearly seen which partial windings are in the same slots and which must therefore have the same electrical phase. It will be noted that partial windings I1' and I2' are inserted into the same slots, namely slots 1, 4, 7, etc. These two partial windings thus will have the same elecrical phase and can be treated in the same manner electrically. The same can be said for partial windings III2' and III1', as well as windings III1' and II2'.

The reason for the drastic increase in space utilization due to the automatic winding method of the present invention is that the crossover places mentioned with regard to the known windings have been eliminated. Each slot therefore can be filled from its base in an optimum fashion. Since a greater number of wire ends must be accommodated than in the known method, the electrical connection can also be carried out automatically.

Figure 5A:
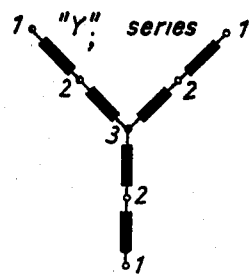
FIGS. 5a-5d show a number of possible variations of electrical interconnections of the partial windings.
Figure 5B:
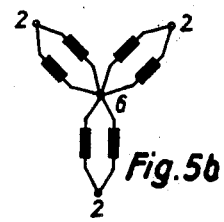
Figure 5C:
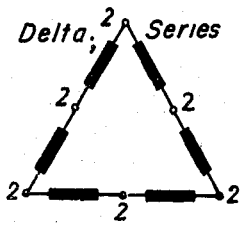
Figure 5D:
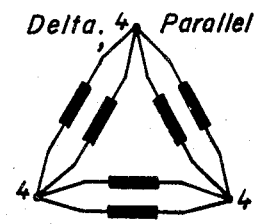

FIGS. 5a–5d show the various possible configurations into which the partial windings may be connected. Since two of the partial windings inserted into the stator must have the same phase, the following connections may be made:

(1) a star-series connection corresponding to FIG. 5a, in which the two partial windings have the same phase are connected in series and the known star or Y connection is then made;

(2) a star-parallel circuit in which the two partial windings constituting the same phase are connected in parallel and the usual star or Y connection is then made;

(3) a Δ series circuit in which the two partial windings of the same phase are again connected in series, but a Δ connection is then carried out; and (4) a Δ - parallel circuit corresponding to FIG. 5d, in which the partial windings of the same phase are connected in parallel and the so-connected parallel circuits are then connected to form a Δ circuit.

It is obvious that the circuits in which the partial windings are connected in parallel will be able to deliver a higher current, while the series circuit will, for the same current, result in a higher phase voltage.

Before the individual configurations of FIG. 5a–5d are discussed, the winding ends for the particular partial windings will be specified:
 1. Partial winding I1':U1-X1
 2. Partial winding III2':W2-Z2
 1. Partial winding III1':V1-Y1

2. Partial winding I2':U2-X2
 1. Partial winding III1':W1-Z1
 2. Partial winding II2':V2-Y2

To realize the configuration shown in FIG. 5a, the following connections must be made:
 (a) X1 to U2; Y1 to V2; Z1 to W2.
It will be noted that, according to the arrows in FIG. 4, current flows into ends U1, V1, and W2, while current flows out of ends X1, Y1, Z2. Current flowing out of X1 flows into U2 so that the two partial windings of the first phase are connected into a true series circuit. The same can be seen for the partial windings of each of the other two phases. The center point of the Y connection and the external phase connections then are as follows:
 (b) to form the center point of the Y connection, the connection X2-Y2, Z2 is carried out; and
 (c) the external phase connections are: U1; V1; W1.

It will be noted that to form the Y-series connection four connecting processes must be carried out, namely
 to form the center point of the Y connection, three wires must be connected once, and
 for the internal connections of each phase, a connection of two wires must be carried out three times.
 Three external phase connections result.

The Y-series circuit requires four internal connections and generates a relatively high output voltage, higher output currents requiring correspondingly higher wire diameters. Further, this configuration requires the least number of windings of the four configurations under consideration. Thus the operating time of the winding apparatus or the winding time is the shortest and the production rate the highest. Further, relatively large wire diameters result in relatively higher utilization factors than do thinner wire diameters. For the Y or star parallel circuit corresponding to FIG. 5b, the center point of the Y is made by the following connections:

(b) center point connections: X1-X2-Y1-Y2-Z1-Z2.

(c) for the external phase connections, the following connections must be made: U1 to U2; V1 to V2; W1 to W2.

The configuration of FIG. 5b therefore requires a one-time connection of six wires to form the center point of the Y and a three-time connection of two wires each, which then also constitute the external phase connections.

For the circuit shown in FIG. 5c, the following internal connections must be made:

(a) X1 to U2; Y1 to V2; Z1 to W2.

(c) The external phase connections are then created as follows: U1 to Z2; X2 to V1; Y2 to W1.

Thus for a Δ series circuit, two wires must be connected three times for the internal connections, and two wires must be connected three times to form the external phase connections.

For the Δ- circuit, each internal phase connection also forms an external phase connection, as follows:

(c) Phase connections: p1 Phase connection I: U1 to U2 to Z1 to Z2;

Phase connection II: X1 to X2 to V1 to V2;

Phase connection III: Y1 to Y2 to W2 to W1.

Thus, four wires must be connected to each other three times. For this configuration, higher output currents will be obtained. For high number of windings and a relatively long winding time, the advantage of a very simple connecting scheme is achieved. It must be understood that in all four configurations, the same current at the same voltage may be achieved by a corresponding change in the wire diameter and the number of windings. Thus, comparable output powers can be achieved in all of these configurations.

As shown in FIG. 6, for an alternator built in accordance with the present invention, a current of 85 amperes can be achieved at 6,000 rpm. For this experimental model, the stator winding was connected in a Δ configuration.

It will be noted that the basic concept of the present invention can be applied to other variations, for example the individual phase windings may be divided into more than two partial windings. Since each partial winding always starts in a slot immediately adjacent to the slot of the previous winding start, every third winding will be associated with the same phase and will have straight portions in the same stator slots. If four partial windings are used per phase, the first partial winding will be placed into slot 1 in a first direction, for example upward. The second partial winding would be placed into the first slot in a downward direction, the third in an upward, and the fourth in a downward.

Various changes and modifications may be made within the scope of the inventive concepts.

I claim:

1. Method for automatically winding stator windings in the slots of a stator of an n phase alternator, comprising the steps of
    winding each of a plurality of partial windings in its entirety in said slots of said stator, each starting at a starting slot immediately adjacent to the starting slot of the last previously wound of said partial windings, each skipping a plurality of slots equal in number to n−1 so that said partial windings mutually overlap and fill said slots with optimum utilization of the space therein, each of said partial windings having a winding start and a winding end; and
    subsequently interconnecting said winding starts and winding ends electrically in accordance with the placement of each of said partial windings in said slots.

2. A method as set forth in claim 1, wherein at least a first and second partial winding is associated with each of said phases;
    wherein said stator has a first and second side extending in a direction substantially perpendicular to the direction of said slots;
    wherein said first partial winding of each of said phases is placed in the associated ones of said slots so that first connecting arcs form alternately at said first and second sides of said stator for each of said partial windings; and
    wherein said second partial winding of each of said phases is placed in the slots of the corresponding one of said first partial windings in a direction opposite thereto so that second connecting arcs located on said sides of said stator opposite said first connecting arcs are formed.

3. A method as set forth in claim 2, wherein said first partial windings of each of said phases following said first phase is placed in said slots so that said connecting arcs form on the same side of said stator as said connecting arcs of said first partial winding of said first phase.

4. A method as set forth in claim 1, wherein said alternator is a three-phase alternator;
    wherein six partial windings are wound on said stator; and
    wherein said step of connecting said winding starts and winding ends comprises connecting said winding starts and winding ends of each of said first and second partial windings together to form a series or a parallel circuit, and connecting the so-formed series or parallel circuit to form a predetermined electrical configuration.

5. A method as set forth in claim 4, wherein said electrical configuration is a Y connection.

6. A method as set forth in claim 4, wherein said electrical configuration is a Δ configuration.

7. In an n phase alternator having a stator having a plurality of slots, a stator winding comprising
    at least a first and second partial winding for each of said phases, said partial windings being inserted in said slots of said stator in their entirety, each starting at a stator slot immediately adjacent to the stator slot of the start of the last previously wound of said partial windings, each of said partial windings having a winding end and a winding start; and
    means for connecting said winding starts and winding ends of partial windings associated with a given phase to each other to form a series or a parallel circuit, and for connecting the so-formed series or parallel circuit to form a predetermined electrical configuration.

8. An alternator as set forth in claim 7, wherein said predetermined electrical configuration is a Y circuit.

9. An alternator as set forth in claim 7, wherein said predetermined electrical configuration is a Δ circuit.

* * * * *